June 14, 1955  J. A. SENN  2,710,934
MOTOR CONTROLLED MACHINE TOOL POSITIONING MECHANISM
Filed Feb. 11, 1950  6 Sheets-Sheet 3

INVENTOR.
Jurg A. Senn
BY
W. D. O'Connor
Attorney

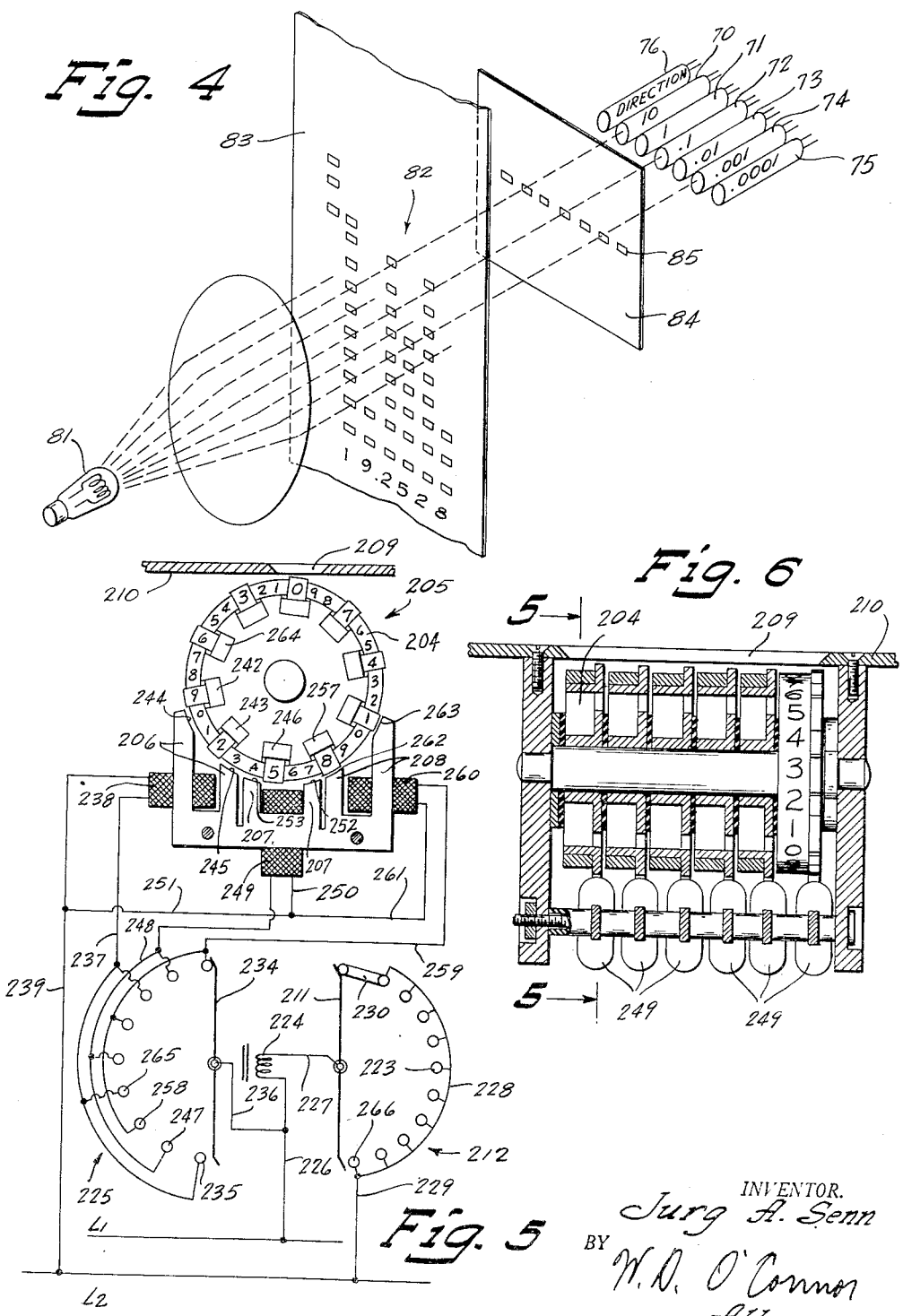

June 14, 1955  J. A. SENN  2,710,934
MOTOR CONTROLLED MACHINE TOOL POSITIONING MECHANISM
Filed Feb. 11, 1950  6 Sheets-Sheet 5

INVENTOR.
Jurg A. Senn
BY
W. D. O'Connor
Attorney

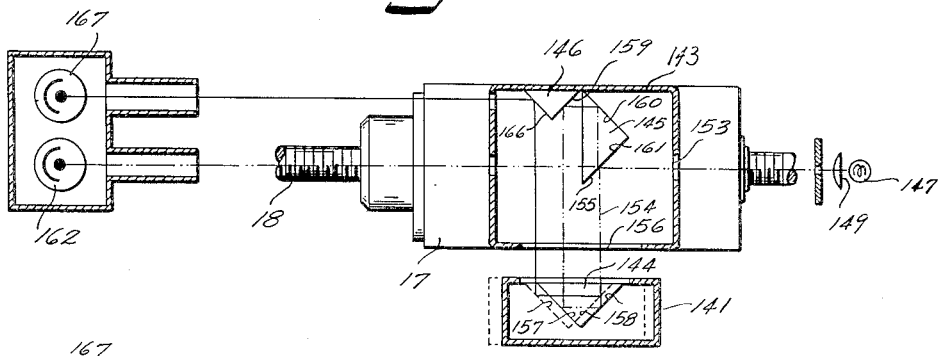
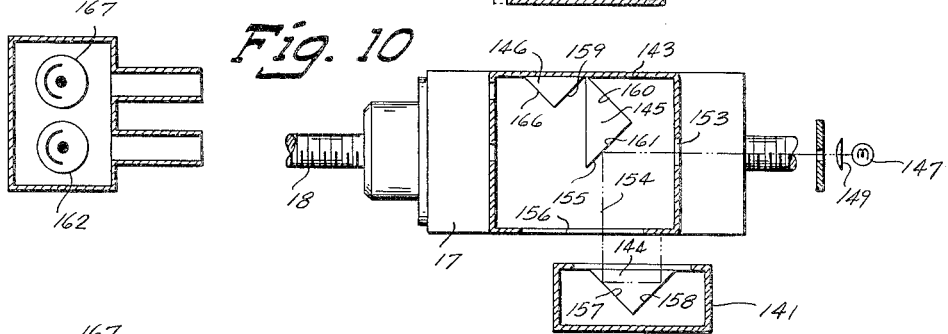
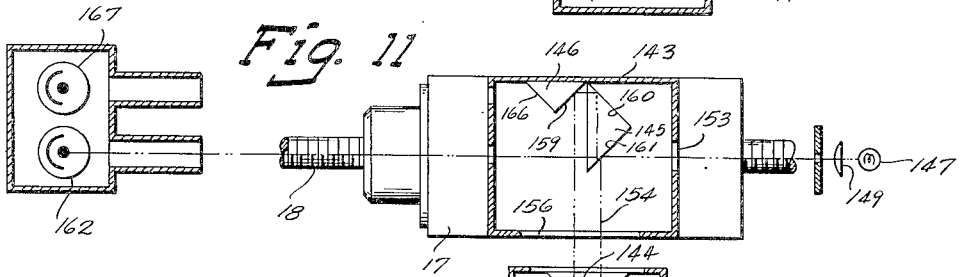
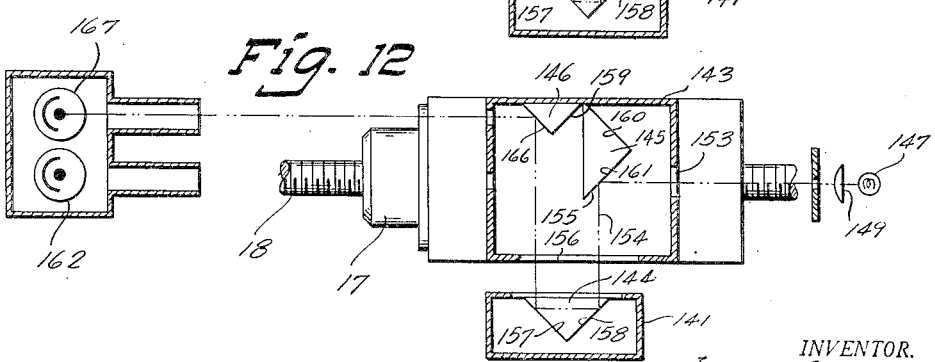

United States Patent Office 2,710,934
Patented June 14, 1955

2,710,934

MOTOR CONTROLLED MACHINE TOOL POSITIONING MECHANISM

Jurg A. Senn, Milwaukee, Wis., assignor to Kearney & Trecker Corporation, West Allis, Wis., a corporation of Wisconsin Application February 11, 1950, Serial No. 143,780

22 Claims. (Cl. 318—162)

This invention relates generally to improvements in positioning mechanisms and more particularly to an improved mechanism for positioning the movable elements of a machine tool.

A general object of the invention is to provide an improved apparatus for selectively positioning the several movable elements of a machine tool automatically.

Another object of the invention is to provide an improved apparatus for positioning the movable elements of a machine tool with a high degree of accuracy regardless of the direction of travel.

Another object of the invention is to provide an improved mechanism for accurately positioning any one of the several movable elements of a machine tool selectively.

Another object of the invention is to provide in a positioning apparatus, a photoelectric tripping mechanism adapted for decreasing the speed of the movable element as it approaches a predetermined position and subsequently terminating its movement at the precise desired final position.

Another object is to provide an improved tripping mechanism that is actuated through the directing of a beam of light toward a photoelectric cell by the element in motion upon its arrival at the desired position.

Another object is to provide an improved tripping mechanism actuated by two photoelectric cells upon exposure to a beam of light successively, either one of which, depending upon which is energized first, functioning to reduce the speed of the moving element, with the second photoelectric cell to be energized, functioning to stop the moving element at a predetermined position.

Another object is to provide an improved scale and vernier arrangement for effecting accurate measurements of displacements.

Another object is to provide a plurality of stations arranged in vernier relationship to scan a dial for projecting the passing scale indicia onto a photoelectric cell to count them, wherein a vernier effect is obtained by selecting one or another of the scanning stations to cooperate with the scale.

A further object is to provide a numeral indicator which will indicate numbers by registering each digit individually in response to electrical impulses.

According to this invention, each of the several movable elements of a machine tool may be positioned selectively with extreme accuracy from either direction of movement automatically. The final position of the selected movable element is established by the location of a gauge nut which is moved automatically to the predetermined position. To this end, the number representing the desired distance of movement is registered on a counter, after which movement of the gauge nut is initiated. As the gauge nut travels toward the predetermined position, impulses are transmitted to the counter, each impulse representing a unit of measurement. When the number of impulses transmitted to the counter approaches the total of the number previously registered thereon, the counter decreases the speed of the gauge nut. The nut then continues to move at a slow rate until the number of impulses transmitted to the counter is equal to the number registered on it, whereupon the gauge nut is stopped at precisely the desired position.

After the nut is located, movement of the movable element is automatically initiated at a rapid rate. When it arrives at a certain position relative to the gauge nut, a beam of light is reflected toward one or the other of two photoelectric cells, causing it to be energized and to operate to decrease the speed of the movable element. The movable element then continues to travel at a slow rate until it arrives at a second position relative to the gauge nut, when it reflects the beam of light toward the second photoelectric cell, causing it to be energized and to operate to stop the movable element at the precise desired position.

The order in which the two photoelectric cells are activated is immaterial, as the first to be energized, irrespective of which one it is, functions to decrease the speed of the movable element, while the second one to be energized functions to stop it. Such arrangement permits the movable elements to be positioned from either direction.

The foregoing and other objects of this invention, which will become more fully apparent from the following detailed specification, may be achieved by means of the particular structure constituting an exemplifying embodiment of the invention that is shown in and described in connection with the accompanying drawings, in which:

Fig. 4 is a fragmentary view in perspective of the perforated tape for registering the number representing the desired distance of movement, with its cooperating photoelectric cells;

Fig. 5 is a detailed view in vertical section along the plane represented by the line 5—5 in Fig. 6 showing the numeral indicating mechanism with a schematic wiring diagram of the associated electrical impulse generating circuit;

Fig. 6 is a view largely in vertical section taken longitudinally through the axis of the numeral indicating mechanism;

This invention constitutes modifications of and improvements upon the machine tool positioning mechanism set forth in my copending application Serial No. 81,992, filed March 17, 1949. Some parts of the machine which are identical with mechanisms described in detail in the previous application are not herein again described but rather are included by reference.

Figure 1:
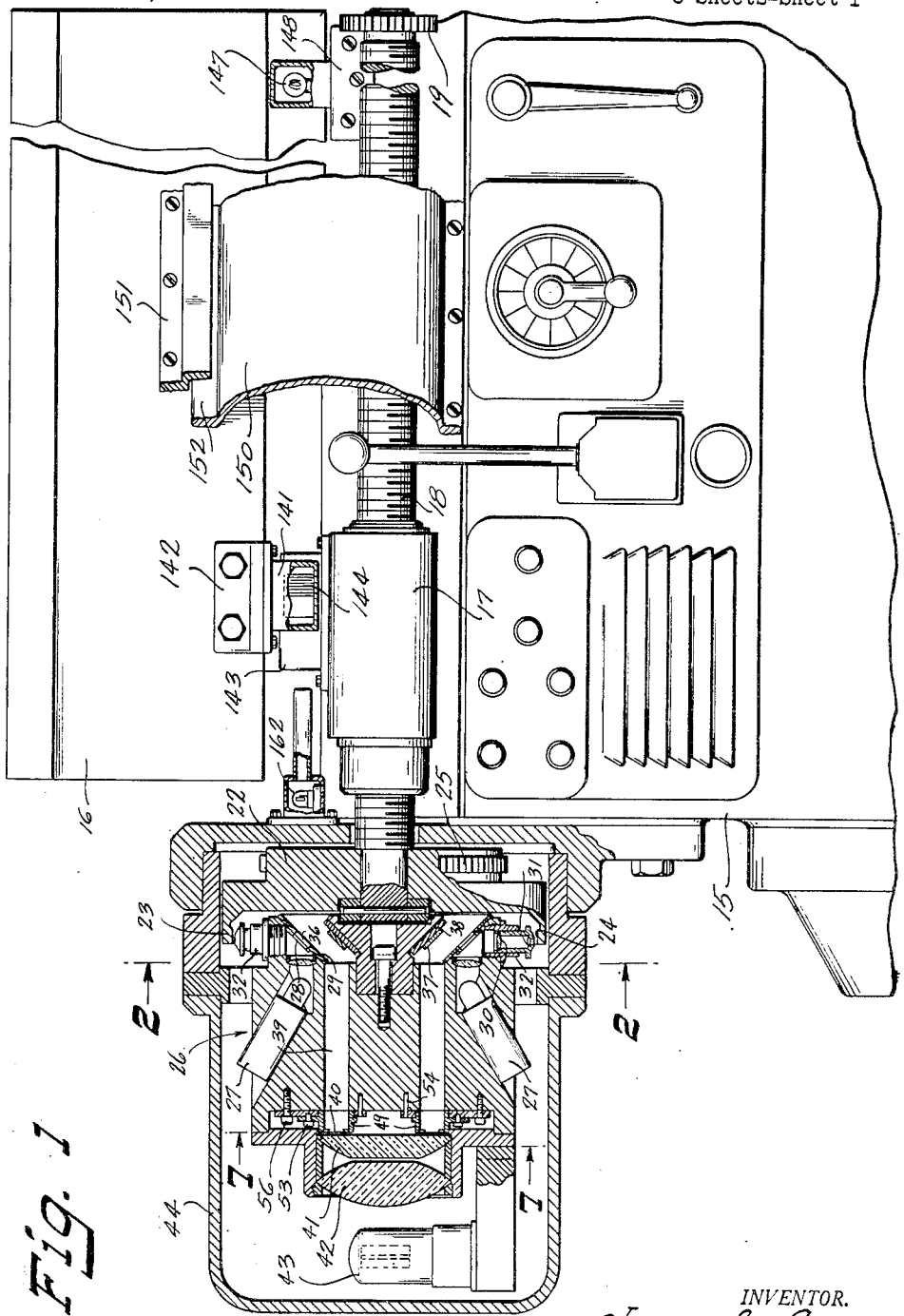
Figure 1 is a fragmentary view, partly in elevation and partly in vertical section, showing portions of the bed and table of a machine tool equipped with positioning mechanism including a scale scanning device and an electronic tripping apparatus constructed in accordance with the teachings of the present invention.

Referring more specifically to the drawings, and particularly to Fig. 1 thereof constituting a general view of parts of a machine tool embodying the present invention, it will be seen that the machine structure there shown comprises essentially a bed 15 upon which is slidably supported a work table or carriage 16. The machine may be of the type illustrated in my previously mentioned copending application in which a spindle head carrying column extends upright at the side of the table 16, with the spindle head slidably mounted on the column for vertical movement. The spindle head carries a horizontally slidable spindle supporting ram in which is rotatably mounted a cutter carrying spindle disposed to cooperate with the work table 16. These vertical and horizontal movements of the cutter spindle taken with the longitudinal movement of the table 16 transversely of the cutter spindle, provide for relative adjustment between the cutter and the workpiece in three mutually transverse planes, whereby the cutter may be caused to operate at any desired position relative to the workpiece within the capacity of the machine.

The table 16 may be moved by power in either direction, either at selected feed rate or at rapid traverse rate, by means of the usual driving mechanism disposed within the bed 15. Furthermore, in accordance with the present invention, the table may be moved precisely to any predetermined position within its range of movement through the operation of an improved fully automatic positioning mechanism utilizing two separate motors (not shown) one of which functions to drive the table at a rapid rate through its approach movement while the other drives it at a slow rate through a short distance to precisely its final position, as fully described in the previously mentioned copending application.

The present invention provides improved apparatus for selectively positioning any of the several movable elements of a machine tool which in this instance include the table 16, disposed for horizontal movements, a spindle head (not shown) arranged for vertical movements, and a spindle ram (not shown) mounted for horizontal movements transverse to the movement of the table. Since the actual positioning mechanism for all three of these elements may be identical in structure and operation, this description will be confined for the most part to the particular apparatus provided for positioning the table.

The final position of the table 16 is established by the predetermined location of a gauge nut 17 which functions as a tripping element as will be later described. The nut has threaded engagement with a gauge screw 18 rotatably mounted in the bed 15, and provided at one end with a gear 19 arranged to be driven by either one of two motors 20 and 21 shown diagrammatically in Fig. 3. The motor 20 revolves the screw 18 at a high speed to move the gauge nut 17 at a rapid rate until its final position is approached whereupon the motor 20 is de-energized and the other motor 21 is energized automatically to drive the gauge nut 17 at a slow rate to its final position.

Rigidly secured to the opposite or forward end of the screw 18 is a circular plate 22 having a peripheral extension or flange 23, the inner surface of which is graduated to form a circular internal dial 24. An external spur gear 25 is formed on the opposite side of the circular plate 22 and is connected by gearing to a hand crank (not shown) for manually revolving the screw 18 in the manner shown in the previously mentioned copending application. For effecting precise manual positioning of the gauge nut 17, the external surface of the peripheral extension 23 is provided with a scale graduated identically with the scale 24 which may be read through a window (not shown) bearing a vernier scale. The vernier scale is read against the circular scale to permit accurate readings, as in this instance, to within one tenth of a thousandth of an inch.

Figure 2:
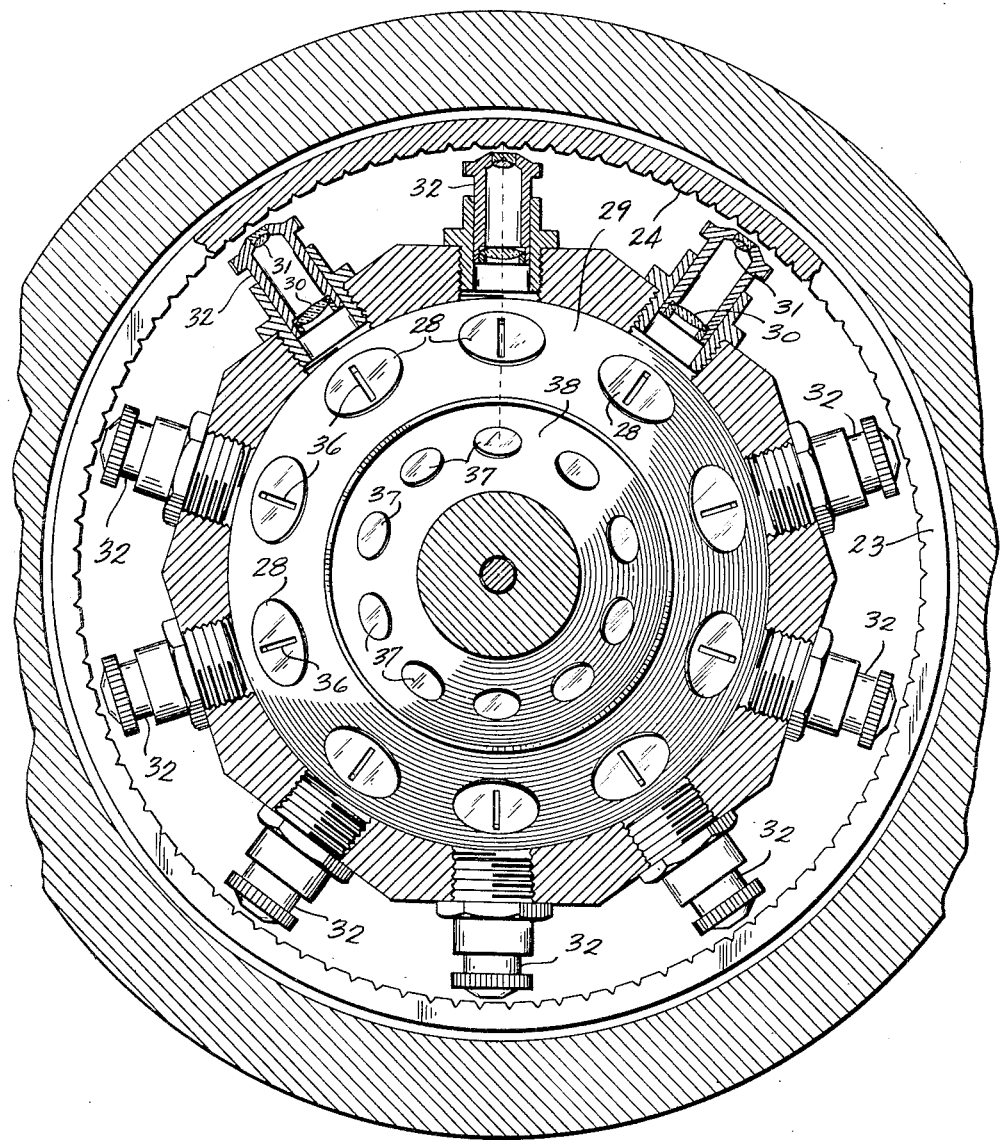
Fig. 2 is an enlarged view, partly in vertical section, taken on the plane represented by the line 2—2 in Fig. 1, showing the vernier arrangement of the ten scanning units.

Rigidly mounted within the circular dial 24 are ten scanning units 26 radially positioned and arranged in a circle in vernier relationship, as shown in Fig. 2, any one of which may be selected to scan the dial 24 as it rotates with the screw 18. The graduation marks of the dial 24 represent thousandths of an inch of movement of the gauge nut 17 along the bed 15 and the scanning units are so positioned as to constitute a vernier reading in tenths of thousandths of an inch. Thus, as the dial revolves, the scanning unit selected is so positioned that when it completes the counting of thousandths of an inch and the dial 24 stops with the last graduation mark in alignment with the scanner unit, the graduation marks will not be in register with their initial positions but will be offset by the vernier action through an amount equal to the angular displacement represented by the tenths of thousandths involved in the measurement. Although the present embodiment shows the scanning units in a circle within an internal circular dial, other arrangements may be made without departing from the spirit and scope of the invention.

The scanning unit to be selected depends upon the number of tenths of thousandths of an inch of movement desired and the direction in which the movement is to occur. If a forward or rightward movement of the table 16 is effected, the dial 24 will rotate in a counterclockwise direction, while if a reverse or leftward movement of the table 16 is effected, the dial 24 will rotate in a clockwise direction. In Fig. 2, the top central scanning unit is depicted as being in alignment with one of the graduations of the circular dial 24 and is therefore the zero unit or base from which the value of the other units is determined. Thus, if the desired movement will produce a rotation of the graduated dial 24 in a counterclockwise direction and the displacement includes two tenths of thousandths of an inch of movement, the second scanning unit counting in a clockwise direction from the zero unit is actuated to scan the circular dial 24 as it rotates.

The second scanning unit is so positioned that the circular dial 24 will be angularly displaced through an amount representing two tenths of thousandths of an inch of movement of the gauge nut 17 before a graduation mark registers with the scanning unit to transmit an impulse to the recording mechanism. Upon completion of the positioning movement, one of the graduation marks of the dial 24 will be in registration with the selected scanning unit and it then becomes the zero unit from which the value of the other units is determined for the next movement. It will then bear the same relation to the other units in respect to the dial 24 as did the top central scanning unit before the movement occurred.

If the desired movement were in the opposite direction to produce a clockwise rotation of the dial 24, and the displacement included two tenths of thousandths of an inch of movement, the second scanning unit, counting in a counterclockwise direction from the zero unit instead of a clockwise direction, would be actuated to scan the circular dial. The same effect would then be obtained as previously explained for rotation in the counterclockwise direction. The dial 24 would be angularly displaced through an amount representing two tenths of thousandths of an inch of movement of the gauge nut 17 before a graduation mark would register with the selected scanning unit to transmit an impulse to the recording mechanism. Again, upon completion of the positioning movement, a graduation mark would be in alignment with the selected scanning unit to establish it as the zero unit from which the next determination is made.

Each of the scanning units 26 comprises a light source 27 arranged to transmit its light toward a mirror 28 secured to a frusto-conical surface 29. From the mirror 28, the light is reflected through a pair of lenses 30 and 31 to the dial 24, the lenses being mounted in a housing 32. The dial 24 is preferably constructed with a reflective background having nonreflective graduation marks. As the light strikes the dial, it is reflected back through the lenses 31 and 30 into a slit 36 formed in the mirror 28 and the frusto-conical surface 29 to strike another mirror 37 secured to a second frusto-conical surface 38. The mirror 37 reflects the light through a channel 39 and a slit 40 to a pair of large lenses 41 and 42 which direct the light onto a photoelectric cell 43 centrally located at the forward end of a housing 44.

Figure 7:
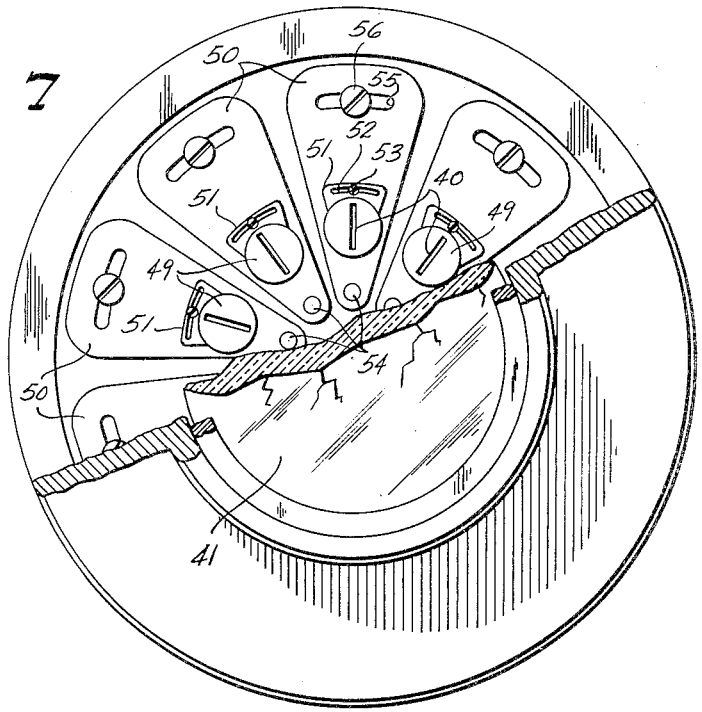
Fig. 7 is a fragmentary detailed view, partly in section, taken substantially along the plane represented by the line 7—7 in Fig. 1, showing the arrangement for adjusting the slit through which the images of the circular scale graduation marks are projected.

The slit 40 is shaped to conform as closely as possible to the size of the projected image of the graduation marks of the dial 24 so that its shadow will have the maximum effect on the photoelectric cell 43. As illustrated in Fig. 7, the position of the slit 40 may be adjusted to bring it into direct alignment with the projection of the graduation marks, being formed in the closed end of a cylinder 49 which is rotatably mounted in a movable plate 50. The cylinder 49 is provided with an extension 51 having an arcuate slot 52 arranged to cooperate with a screw 53 for locking the cylinder 49 in the desired position. The plate 50 is pivotable about a point 54 to provide for arcuate adjustment of the slit 40 and has a slot 55 formed at the end opposite its pivot point to receive a screw 56 for locking it in position when the necessary adjustment has been accomplished.

By means of these two adjustments, the slit 40 may be accurately positioned to coincide with the vernier position of the projected image of a graduation mark of the dial 24 when the dial is in a precisely predetermined position. As the image partially covers the slit 40, the amount of light striking the photoelectric cell 43 is greatly diminished causing it to transmit an impulse to a counter or register 59 (Fig. 3) on which the number representing the desired distance of movement has been registered in a manner to be later described.

The photoelectric cell 43 is arranged to transmit its impulse when a certain portion of the area of the slit 40 is covered by the projected image of the graduation mark. A certain lag from the time of the signal to the time that the moving element comes to rest is inherent in a mechanism of this type, due to the time elapsed in the transmission of the signal as well as the moment of inertia of the moving element. The time elapse for transmission of the signal is a constant which can be readily determined and the movement due to the moment of inertia has been reduced to a minimum in the present invention by decreasing the rate of travel of the movable element before its movement is terminated. Therefore the movement due to the moment of inertia can also be considered as a constant.

To compensate for such lag, the photoelectric cell 43 transmits its impulse before the slit 40 is entirely covered by the projected image of the graduation mark, so that when the moving element does come to rest, the image is at the exact point where it fully covers the slit 40. Such arrangement is provided to permit the movable element to be positioned in either direction of travel so that when the element is at rest, the image of the graduation mark is exactly centered on the slit 40 irrespective of the direction in which the movable element was traveling.

Figure 3:
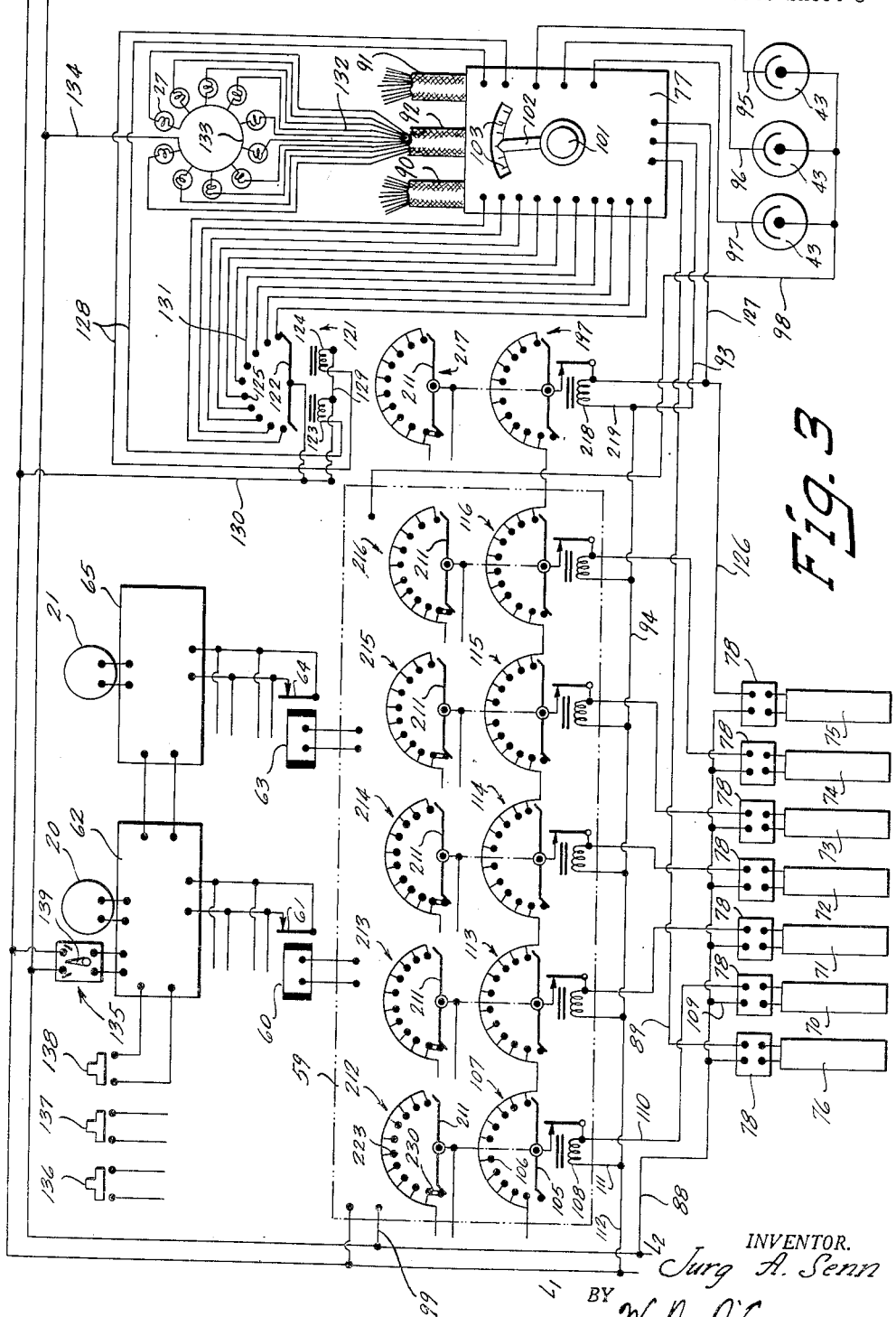
Fig. 3 is a schematic wiring diagram of the electrical circuit for actuating the electronic counting apparatus and selecting the movable element to be positioned.

Referring now to the circuit diagram shown in Fig. 3, when the number of impulses transmitted by the photoelectric cell 43 to the counter 59 approaches the total of the number representing the desired distance of movement previously registered thereon, a relay 60 is actuated by the counter 59. The relay 60 serves to open a contact 61 and break a circuit of a control element 62 to deenergize the rapid rate motor 20 and automatically energize the slow rate motor 21 in the manner explained in the previously mentioned copending application. The gauge nut 17 then continues to move along the screw 18 at a slow rate until the number of impulses transmitted to the counter 59 by the photoelectric cell 43 equals the number previously registered on the counter, whereupon the counter actuates a relay 63 to open a contact 64 and break a circuit of a control element 65 causing deenergization of the slow speed motor 21 to stop the gauge nut 17 at precisely the predetermined position. Upon termination of the movement of the gauge nut 17, movement of the table 16 at a rapid rate is automatically initiated.

The control elements 62 and 65 shown diagrammatically in Fig. 3, controlling the operation of the two gauge nut driving motors 20 and 21, are identical to the corresponding control apparatus explained in detail in my previously mentioned copending application and therefore are not herein described or shown in detail.

The number representing the desired distance of movement is registered on the counter 59 by impulses received from a set of photoelectric cells 70, 71, 72, 73 and 74 (shown diagrammatically in Figs. 3 and 4) one for each of the first five digits of the number, while the sixth digit, representing the tenths of thousandths, is established by impulses from a photoelectric cell 75 connected to select the proper scanning unit 26 of the vernier system to scan the dial 24 and project the images of its graduation marks.

Another photoelectric cell 76 is arranged to effect the electrical connections required for the particular movable element of the machine to be positioned and the direction in which it is to move. An arbitrary number is assigned to each possible condition of movement, and a number of impulses corresponding to the number assigned to the desired movement are transmitted to a selector element 77 by the photoelectric cell 76 to complete the desired connections. Each of the photoelectric cells is connected to an amplifier 78, for the purpose of amplifying the signal.

The electrical impulses are created by the photoelectric cells in response to variations in the quantity of light striking them by virtue of rays of light from a source 81 passing through perforations 82 of a movable control tape 83. The tape is perforated beforehand to provide the desired number of impulses, the perforations 82 being arranged in rows, one row for each of the cooperating photoelectric cells as illustrated in Fig. 4.

The first row of perforations on the tape 83 shown in Fig. 4 is arranged to cooperate with the photoelectric cell 76 to complete the necessary electrical connections for the movable element to be positioned and the direction in which it is to move. In this instance, the number three has been assigned for movement of the table 16 in a forward or rightward direction, therefore three impulses must be transmitted to the selector element 77 to connect the controls for positioning the table in a forward direction. Accordingly, the first row on the tape 83 is provided with three perforations.

As the tape 83 is moved upwards, the light from the source 81 passes consecutively through each of the three perforations, to a gate 84 provided with openings 85 to limit the size of the beam passing through. From the opening 85 of the gate 84, the light continues to the photoelectric cell 76. The light passing through the three perforations in the first row of the perforations 82, causes the photoelectric cell 76 to transmit three electrical impulses to the selector element 77 through the amplifier 78.

The current for generating the impulses originates at a source represented in Fig. 3 by line conductors $L_1$ and $L_2$ and proceeds through a conductor 88 from line conductor $L_2$ to the amplifier 78 and thence to the photoelectric cell 76. Upon actuating the photoelectric cell 76 by exposure to the light beam, the current continues through it to the amplifier 78 and thence through a conductor 89 to the selector element 77. The current flows through the selector element 77 to operate a switching arrangement of a type well known in the art and therefore not shown here in detail. From the selector element 77, the control current returns to its source through a conductor 93 and a conductor 94 connected to the line conductor L₁.

Each of the three movable elements has its own circular scale 24 and scanning mechanism, as shown in Fig. 1 for the table 16. Accordingly, the selector element 77 has three cables of ten wires each connected to the ten light sources 27 of the scanning units 26 of the respective movable elements. For example, a cable 90 connects to the scanning units 26 of the spindle ram, a cable 91 connects to the scanning units of the spindle head, and as shown diagrammatically in Fig. 3, a cable 92 has its ten wires connected to the ten light sources 27 of the table scanning units 26. Since each of the movable elements has its own scanning mechanism, connections must also be made to the corresponding one of three photoelectric cells 43 through the selector element 77. These three photoelectric cells are shown diagrammatically in Fig. 3, the current flowing to them from the source represented by the line conductors L₁ and L₂ through the conductors 94 and 93 into the selector element 77 and thence through a switch (not shown) to any one of three conductors 95, 96 and 97, depending upon which movable element has been selected for positioning. The current then flows to the selected photoelectric cell 43, and thence through a conductor 98 to the counter 59. After flowing through the mechanism of the counter 59 to register an impulse, the current returns to its source through a conductor 99.

The selector element 77 may also be actuated manually to make the electrical connections for the movable element to be positioned and its direction of movement, by revolving a knob 101 to position the switches contained within the selector element. The knob 101 and an associated indicating arm 102 may be moved into any one of six positions 103, two positions, forward and reverse, for each of the three movable elements. The movable element selected and its direction of movement is indicated by the indicating arm 102 regardless of whether the connections are made manually or automatically.

The photoelectric cells 70, 71, 72, 73 and 74 are connected to the counter 59 through the amplifiers 78 to register upon it the first five digits of the number representing the desired distance of movement by means of impulses created by the variations in quantity of light to which the photoelectric cells are subjected. These impulses register the number on the counter 59 in the same manner as do the impulses produced by the tabulator dial in my previously mentioned copending application. The counter 59 is made up of five decade registers, the first unit registering increments of ten inches each, the second unit, increments of inches, the third, increments of tenths of inches, the fourth, increments of hundredths of inches, and the fifth, increments of thousandths of inches. By this arrangement, it is possible to set up in the counter any required dimension, up to one hundred inches in this particular instance, and it is evident that the series of decade registers could be arranged readily to accommodate any desired range of measurement expressed in any system of measuring units whether linear or angular.

In registering the digits on the counter 59, the number of impulses required is not the number it is desired to register, but rather the difference between the desired number and eleven. For example, assuming that it is desired to register the numeral "1" on the first decade of the counter 59, it would be necessary for the photoelectric cell 70 to transmit ten impulses to the counter. Each impulse functions to move a wiper arm 105 to the succeeding contact of a series of eleven contacts 106 of a stepping switch 107 the wiper arm being actuated in its step by step movement by a coil 108 connected to receive the impulses from the photoelectric cell 70, each impulse to the coil functioning to move the wiper arm 105 to the next contact.

The wiper arm 105 is in the "off" position as shown in Fig. 3. The first impulse to the coil 108 operates to move the wiper arm to the next contact which is its "zero" position. The next nine impulses move the wiper arm over the succeeding nine contacts to the last one of the series, which in effect results in cancelling nine counts in the first decade of the counter 59, leaving the desired number of one count set up in the counter to be cancelled by the impulses received from the photoelectric cell 43 of the scanning mechanism.

The current for energizing the coil 108 of the stepping switch 107 originates at the source represented by the line conductors L₁ and L₂ and flows through the conductor 88, a conductor 109 and the amplifier 78 to the photoelectric cell 70. From the photoelectric cell 70, the current returns to the amplifier 78 and continues through a conductor 110 to the coil 108, returning to the line conductor L₁ through a conductor 111 and a conductor 112. The remaining four digits are registered on the counter 59 in like manner, a stepping switch 113 cooperating with the photoelectric cell 71, a stepping switch 114 cooperating with the photoelectric cell 72, a stepping switch 115 cooperating with the photoelectric cell 73, and a stepping switch 116 cooperating with the photoelectric cell 74.

A stepping switch 121 is provided for selecting the proper one of the ten vernier scanning units 26 to establish the desired tenths of thousandths of an inch of measurement. A wiper arm 122 of the stepping switch 121 is actuated in its movement upon energization of either one of two coils 123 and 124, depending upon the desired direction of movement. The coil 123 functions to actuate the wiper arm 122 in a counterclockwise direction while the coil 124 actuates the wiper arm 122 in a clockwise direction.

Whether the coil 123 or the coil 124 is energized is determined by a switching arrangement (not shown) within the selector element 77 in response to the number of impulses transmitted to it by the photoelectric cell 76. Thus, in the previously mentioned example, three impulses were transmitted to the selector element 77 by the photoelectric cell 76 to set the controls for movement of the table 16 in a forward direction. In response to these three impulses, the switching arrangement within the selector element 77 is set to connect the coil 123 to receive impulses from the photoelectric cell 75 which will actuate the wiper arm 122 of the stepping switch 121 in a counterclockwise direction.

If it were desired to position the table 16 in a reverse or leftwardly direction, four impulses would be required from the photoelectric cell 76 which would effect the same connections for control of movement of the table, except that the coil 124 instead of the coil 123 would be connected to receive the impulses from the photoelectric cell 75 to actuate the wiper arm 122 in a clockwise direction.

The wiper arm 122 is arranged to communicate successively with each one of a series of ten contacts 125 which are individually connected through the selector element 77 to their corresponding light sources 27. For the purpose of uniformity, the connections are so arranged that the number of impulses required to be transmitted to the coils 123 or 124 is also the difference between the desired numeral and eleven, but the first impulse transmitted by the photoelectric cell 75 has no effect on the stepping switch 121. The first impulse is absorbed by the switching mechanism within the selector element 77 and the second impulse actuates the wiper arm 122 in its first step.

The wiper arm 122 is always in communication with one of the ten contacts 125. Upon the completion of a positioning movement, the wiper arm 122 remains in communication with its last cooperating contact, and that contact becomes the zero contact, regardless of which it may be, from which the next movement is based. This arrangement establishes its communicating scanning unit 26, which is in registration with a graduation mark of the dial 24, as the zero or base unit, as previously explained.

The current for energizing the coils 123 and 124 of the stepping switch 121 originates at the source represented by the line conductors $L_1$ and $L_2$ and flows through a conductor 88 to the amplifier 78 and thence to the photoelectric cell 75. Upon exposure of the photo-electric cell 75 to light, the current flows through it and the amplifier 78 to a conductor 126 and a conductor 127 to the selector element 77. Within the selector element 77, the current flows through the switching arrangement (not shown) which has been set in response to the number of impulses received from the photoelectric cell 76 and thence through either one of two conductors 128, depending upon which of the coils 123 and 124 has been selected to actuate the stepping switch 121. From the conductor 128, the current flows through either the coil 123 or 124 and thence to a conductor 129 to return to its source through a conductor 130.

Upon moving the wiper arm 122 to the proper contact, the current flows from its source represented by the line conductors $L_1$ and $L_2$ to the conductor 130 connected to the wiper arm 122 and from the wiper arm to whichever one of the contacts 125 has communication with it. From the communicating contact 125, the current flows through the cooperating conductor of a group of conductors 131 to the selector element 77. The switching arrangement within the selector element 77 connects the conductors 131 with the respective conductors of one of the cables 90, 91 and 92, depending upon the number of impulses received by the selector element 77 from the element selecting photoelectric cell 76. Assuming again that the table 16 has been selected to be positioned, the conductors 131 are connected respectively to a group of conductors 132 of the cable 92 and the current flows through the selected one of the conductors 132 to its cooperating light source of the group of light sources 27 and thence through a conductor 133 and a conductor 134 to return to its source.

Since the number of impulses required to be transmitted to the counter 59 and the coil 124 is the difference between the value of each digit and eleven, it follows that the corresponding rows of the perforations 82 must each have the number of perforations representing this difference. Assuming that the number representing the desired distance of movement is 19.2528, the tape 83 will be perforated as illustrated in Fig. 4. The second row, representing the first digit of the numeral has ten perforations to register the numeral "1." The third row has two perforations to register the numeral "9," the fourth row has nine perforations representing the numeral "2," the fifth row has six perforations for the numeral "5," the seventh row has nine perforations for the numeral "2" and the last row has three perforations to register the numeral "8."

After the tape 83 has been moved in its path of travel to register the number representing the desired distance of movement on the decades of the counter 59 and to select the proper scanning unit as well as to make the proper connections for the desired movable element to be positioned and its direction of movement, a direction switch 135 is manipulated by pivoting a pointer 139 to either one of two positions to make the proper connections for driving the movable element selected and the gauge nut 17 in the desired direction, either forward or reverse. Then the appropriate one of three push buttons 136, 137 and 138 is actuated to initiate the positioning movement. Each of the movable elements has its own control elements 62 and 65 and direction switch 135 which are illustrated diagrammatically in Fig. 3 for the table 16 only. Thus, the push button 136 is arranged to be connected to the control elements for the spindle ram and the push button 137 is connected to the control elements for the spindle head. The push button 138 is connected to the control element 62 for the table as shown in Fig. 3, and when actuated, it energizes the motor 20 to initiate movement of the gauge nut 17 at a rapid rate.

After the gauge nut 17 has been located in accordance with the number registered on the counter 59, the table 16 is automatically initiated in its movement at a rapid rate toward the predetermined position established by the gauge nut. The tripping apparatus controlling movement of the table includes a housing 141 depending from a bracket 142 secured to the rear edge of the table to extend outward from it so that the housing 141 is located for movement adjacent to the line of movement of a housing 143 mounted on top of the gauge nut 17 as shown in Figs. 1 and 9. The housing 141 on the table serves as an enclosure for a prism 144 arranged to cooperate with two prisms 145 and 146 enclosed in the housing 143 on the nut. A light source 147 is secured to the far end of the bed 15 by means of a bracket 148 to direct a beam of light toward the prism 145 on the gauge nut through a collimating lens 149 as shown in Figs. 9 to 12 which are plan views of the prism arrangement. To preclude the entrance of an excessive amount of stray light, the entire tripping apparatus is enclosed by a housing 150 rigidly secured to the bed 15, as shown in Fig. 1. A bracket 151 attached to the table 16 retains the upper edge 152 of the housing 150 to the table, the bracket sliding along the edge 152 as the table 16 moves in its path of travel.

The beam of light from the source 147 passes through an opening 153 in the housing 143 to the prism 145 which reflects the light normal to its path of travel as illustrated by a broken line 154, the light beam being reflected by an outer face 155 of the prism through an opening 156 in the side of the housing 143. Assuming that the table 16 and housing 141 are traveling toward the left as shown in Fig. 9, the prism 144 moving with the table arrives at a point where it first intercepts the light beam represented by the broken line 154, the beam strikes an inner surface 157 of the prism 144 as shown in Fig. 10, which reflects it 90° to another inner surface 158 that in turn reflects it 90° toward the housing 143 at a point where it has no effect on the operation of the table.

As the table 16 continues to move toward the left, the surface 157 passes beyond the path of the light beam as represented by the broken line 154 and the surface 158 moves up to intercept it. When the prism 144 arrives at the position shown in Fig. 11 or that shown in solid lines in Fig. 9, the reflection from the face 155 of the prism 145 strikes the surface 158 of the prism 144 and is reflected to its surface 157. From the surface 157, the light is reflected toward the prism 146 to strike it on its face 159 to be reflected 90° to the right toward an inner surface 160 of the prism 145. From the surface 160, the light beam is reflected toward an opposite inner surface 161 and thence 90° to the left to strike a photoelectric cell 162 mounted at the forward end of the bed 15.

The light striking the photoelectric cell 162 causes it to actuate an electric circuit in a manner to be later described to deenergize the rapid rate motor driving the table 16 and automatically energize the slow rate motor to drive the table at slow speed to its final position. The table continues to move at a slow rate until it moves the prism 144 to the position shown in Fig. 12 and in dotted lines in Fig. 9 where the light beam strikes the surfaces 158 and 157 at points further from the apex of the prism 144. This results in a shifting of the path of the light beam so that it strikes the prism 146 on its opposite face 166 which reflects the beam 90° to the left directly toward a second photoelectric cell 167 mounted beside the cell 162, causing it to actuate an electrical circuit to deenergize the slow rate motor and stop the table 16 at precisely the desired position.

A particular advantage of the present invention lies in the fact that the movable elements may be positioned from either direction as it is immaterial to the tripping action which of the photoelectric cells 162 or 167 are actuated first. The first to be actuated, whether it be the photoelectric cell 162 or the photoelectric cell 167, functions to deenergize the rapid rate motor and initiate operation of the slow rate motor while the second photoelectric cell to be actuated, whichever it may be, functions to deenergize the slow rate motor and terminate movement of the movable element being positioned.

Thus, assuming that the table 16 is moving to the right instead of to the left as previously assumed, when the prism 144 arrives at the position depicted in Fig. 12 and in broken lines in Fig. 9, the light beam strikes the photoelectric cell 167 first, to decrease the speed of the table. As the table continues to move to the right at a slow speed, it moves the prism 144 into the position shown in Fig. 11 and in solid lines in Fig. 9 where the light beam follows the path previously described to strike the photoelectric cell 162 and terminate movement of the table 16 at the desired final position.

Figure 8:
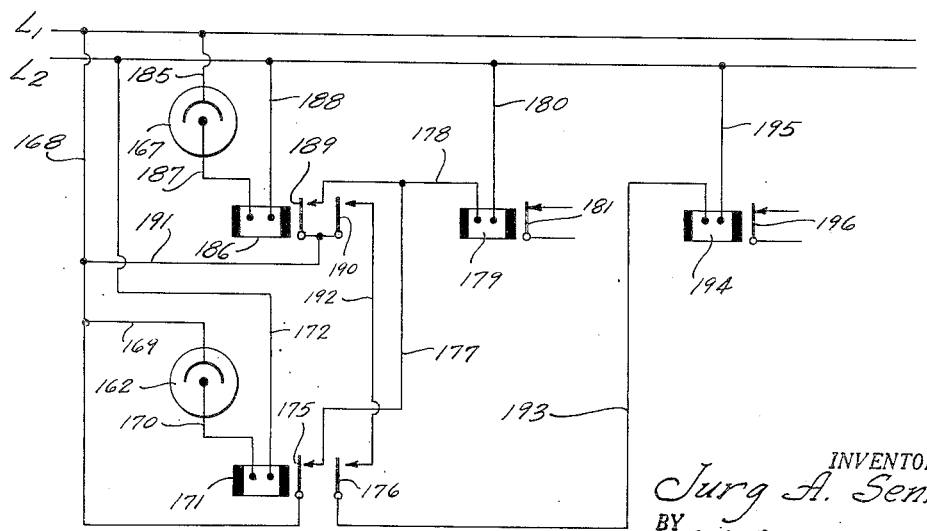
Fig. 8 is a schematic wiring diagram of the electrical circuit for tripping the movable element drive motors; and, Figs. 9 to 12 inclusive are plan views, partly in horizontal section and partly diagrammatic, illustrating the paths of the light beam, with the table prism and the gauge nut prisms in various relative positions.

The dual function of the photoelectric cells 162 and 167 is accomplished by means of the electrical circuit illustrated in Fig. 8. When the photoelectric cell 162 is the first to be actuated by exposure to light from the source 147, current originating at a source represented by the line conductors $L_1$ and $L_2$ flows from the conductor $L_1$ through a conductor 168 and a conductor 169 to the cathode of the photoelectric cell 162 and thence to its anode. From its anode the current proceeds through a conductor 170 to a time delay relay 171 and returns to the line conductor $L_2$ through a conductor 172.

Completion of the foregoing circuit results in energization of the time delay relay 171 with consequent closing of its normally open contacts 175 and 176 to complete a circuit from the source represented by the line conductor $L_1$, through the conductor 168, the closed contact 175, a conductor 177, a conductor 178 to a relay 179. From the relay 179, the current continues through a conductor 180 to return to its source represented by the other line conductor $L_2$. Energization of the relay 179 causes it to open its normally closed contact 181 which deenergizes the table rapid rate motor and automatically energizes the slow rate motor in the manner described in detail in my previously mentioned copending application. Since the control circuits for the table rapid rate motor and slow rate motor are shown and described in detail in my previously mentioned copending application, they are not here again shown or described.

With the rapid rate motor deenergized and the slow rate motor operating, the table 16 will proceed at a slow speed until the prism 144 arrives at the position to direct the light from the source 147 toward the photoelectric cell 167 to actuate it. The current flows to the cathode of the photoelectric cell 167 from the line conductor $L_1$ through a conductor 185, to its anode and thence to a time delay relay 186 through a conductor 187. From the time delay relay 186, the current continues through a conductor 188 to return to its source represented by the line conductor $L_2$.

Energization of the relay 186 results in the closing of its normally open contacts 189 and 190 to complete a circuit from the source represented by the line conductor $L_1$, through the conductor 168, a conductor 191, the closed contact 190, and a conductor 192 to the closed contact 176 of the time delay relay 171. From the closed contact 176, the current proceeds through a conductor 193 to a relay 194 and from the relay 194 it returns to its source represented by the line conductor $L_2$ through a conductor 195. The energized relay 194 opens its normally closed contact 196 to deenergize the motor driving the table 16 at a slow rate and thereby terminate its movement at precisely the predetermined position.

When the table is to be positioned from the opposite direction, that is, moving to the right, the photoelectric cell 167 will be the first to be actuated. Actuation of the photoelectric cell 167 will result in energization of the relay 186 as previously described to close its contacts 189 and 190. Closing of the contact 189 completes a circuit from the source represented by the line conductor $L_1$ through the conductors 168 and 191 to the contact 189. From the contact 189, the current flows into the conductor 178 to the relay 179 and thence through the conductor 180 to return to line conductor $L_2$. Completion of the foregoing circuit energizes the relay 179 causing it to open its contact 181 to deenergize the table rapid rate motor and automatically energize the slow rate motor.

With the slow rate motor energized, the table 16 continues to travel at a slow speed until it brings the prism 144 into position to direct the light from the source 147 toward the photoelectric cell 162. The light striking the photoelectric cell 162 causes it to become conductive and energize the time delay relay 171 through the circuit previously described. The energized relay 171 closes its normally open contacts 175 and 176 to complete a circuit from the line conductor $L_1$ through the conductor 168, and the conductor 191 to the closed contact 190. From the closed contact 190, the current flows through the conductor 192 to the closed contact 176 and thence through the conductor 193 to the relay 194 from which the current returns to its source through the conductor 195. Completion of the foregoing circuit energizes the relay 194 causing it to open its normally closed contact 196 to deenergize the table slow speed motor and stop the table 16 at the desired final position. Thus, the photoelectric cells 162 and 167 function to first decrease the speed of the table 16 and then stop it at precisely the desired position, irrespective of the direction of travel of the table, the distance of movement being determined by the number previously registered on the counter 59. As explained in connection with final positioning of the gauge nut, the tripping action takes place slightly in advance of the precise final position, in order to compensate for the known overtravel of the table, whereby the table comes to rest precisely at the desired position regardless of the direction of approach.

To enable the operator to check the number registered at any time during the cycle of operation, the number is recorded on a numeral indicator illustrated in Figs. 5 and 6, which operates in conjunction with the stepping switches 107, 113, 114, 115, 116 and a stepping switch 197 to visually indicate the number that has been registered as representing the desired distance of movement. It is actuated by remote control and may be mounted in any convenient position on the machine, as for example on the spindle head where it can be readily seen by the operator. The numeral indicator is comprised of a rotatable drum 204 for each digit of the numeral to be indicated, each drum having imprinted on its periphery three series of numerals from "0" to "9," as illustrated in Fig. 6, on the last drum to the right which is shown in elevation. The numerals are also shown on the side of the drum depicted in Fig. 5 but only for the purpose of illustrating the position of the numerals which appear on the periphery of the drum. A series of ten armatures 205 are mounted on each drum, being radially positioned and equally spaced about its periphery. Three pairs of magnetic poles 206, 207 and 208 are located at the lower portion of the drum 204 to cooperate with the armatures 205 for revolving the drum. The numerals of the drum 204 appear individually at a window 209 inserted in a housing 210 which encloses the numeral indicator.

As illustrated in Fig. 3, a wiper arm 211 of each of a series of stepping switches 212, 213, 214, 215, 216 and 217 is mounted on the same shaft as the wiper arms of the counter acuating stepping switches 107, 113, 114, 115 and 116 and the stepping switch 197 respectively, as represented in Fig. 3 by the broken line connecting the two shafts.

The stepping switches 197 and 217 are provided solely for the purpose of registering the number representing the tenths of thousandths of inches of movement, the stepping switch 197 being actuated by a coil 218 receiving its impulses from the photoelectric cell 75. The current for energizing the coil 218 originates at the source represented by the line conductor $L_2$ and proceeds through the conductor 88 to the amplifier 78 and thence to the photoelectric cell 75. When the photoelectric cell 75 is exposed to light, the current continues through it, the amplifier 78 and the conductor 126 to the coil 218. From the coil 218, the current returns to its source through a conductor 219 and the conductor 94.

Since each drum 204 is actuated in the identical manner, the operation of only one drum will be described here. The drum illustrated in Fig. 5 represents the first digit of the numeral to be indicated, and is actuated by the stepping switch 212 operating in conjunction with the stepping switch 107 of the counter 59.

Assuming again that the number 19.2528 is being registered as representing the desired distance of movement, the coil 108 of the stepping switch 107 will receive ten impulses from the photoelectric cell 70. These impulses function to move the wiper arm 105 from the "off" position to the zero position and then over the nine following contacts 106 to cancel nine counts in the counter 59 and leave one count remaining which is the value of the first digit. Since the wiper arm 211 is mounted on the same shaft as is the wiper arm 105, it will move with it over its contacts 223. As the wiper arm 211 moves from one of its cooperating contacts 223 to another, electrical impulses are transmitted to a coil 224 of a stepping switch 225.

The electrical impulses imparted to the coil 224 originate at a source represented by the line conductors $L_1$ and $L_2$ as shown in Fig. 5. From the line conductor $L_1$, the current flows into a conductor 226 to the coil 224 and thence through a conductor 227 to the wiper arm 211. The current proceeds from the wiper arm 211 to the particular contact point 223 which happens to be in communication with the wiper arm, thence through a conductor 228 and a conductor 229 to return to the line conductor $L_2$.

The first impulse from the photoelectric cell 70 to the coil 108 of the stepping switch 107 functions to move the wiper arm 105 from the "off" position shown in Fig. 3 to the next contact which represents the zero position. The wiper arm 211 of the stepping switch 212 moves with the wiper arm 105 in this initial movement but it moves from one end of an elongated contact 230 to the other so as not to interrupt the flow of current to the coil 224. Thus, movement of the wiper arm 105 from its "off" position to its zero position along its contacts 106 has no effect on the coil 224. The remaining nine increments of movement, however, create nine impulses through the coil 224, causing it to move a wiper arm 234 of the stepping switch 225 over nine of its contacts.

The drum 204 is shown in Fig. 5 in its zero position with the numeral "0" visible through the window 209. The first impulse through the coil 224 results in moving the wiper arm 234 into communication with a contact 235 to complete an electrical circuit from the line conductor $L_1$ through the conductor 226 and a conductor 236 to the wiper arm 234. The current flows through the wiper arm 234 to the contact 235 and thence through a conductor 237 to a coil 238, to return to the line conductor $L_2$ through a conductor 239. Completion of the foregoing circuit energizes the coil 238 to excite its cooperating magnetic poles 206. Excitation of the magnetic poles 206 causes them to attract an armature 242 and an armature 243 to revolve the drum 204 one step counterclockwise, bringing the numeral "9" into view through the window 209. The armature 242 is then located immediately adjacent a face 244 of the left magnetic pole 206 while the armature 243 is in a position immediately adjacent a face 245 of the right magnetic pole 206. The armature 243 and an armature 246 are then in position to cooperate with the magnetic poles 207 for revolving the drum 204 another step.

When the second impulse is transmitted to the coil 224, the wiper arm 234 is moved into communication with a contact 247 to complete a circuit from the line conductor $L_1$ through the conductor 226, and the conductor 236 to the wiper arm 234. The current then flows from the wiper arm 234 into the contact 247 and thence through a conductor 248 to a coil 249. From the coil 249, the current proceeds through a conductor 250 and a conductor 251 connected to the conductor 239 to return to the line conductor $L_2$. Completion of the foregoing circuit energizes the coil 249 to excite the magnetic poles 207 which then cooperate with the armatures 243 and 246 to revolve the drum 204 another step and bring the numeral "8" into view at the window 209. The armature 246 then assumes a position immediately opposite a face 252 of the right magnetic pole 207 while the armature 243 is located immediately opposite the left magnetic pole 207. The last increment of movement of the drum 204 also brings the armature 246 and an armature 257 into position to cooperate with the magnetic poles 208 to effect another increment of movement of the drum 204.

The next electrical impulse through the coil 224 functions to move the wiper arm 234 into communication with a contact 258 of the stepping switch 225. This completes an electrical circuit from the line conductor $L_1$ through the conductor 226, and the conductor 236 to the wiper 234 and thence through the contact 258 to a conductor 259 which carries the current to a coil 260. From the coil 260, the current returns to line conductor $L_2$ through a conductor 261 and the conductors 251 and 239.

Upon completion of the foregoing circuit, the magnetic poles 208 are excited by energization of the coil 260 to draw the armatures 246 and 257 immediately opposite a face 262 and a face 263 respectively of the magnetic poles 208. The drum 204 is accordingly revolved through another increment of movement to bring the numeral "7" into view at the window 209 and an armature 264 and the armature 242 are brought into position to operate with the magnetic poles 206.

The following electrical impulse transmitted to the coil 224 operates to move the wiper arm 234 into communication with a contact 265. The contact 265 is connected to complete the same circuit as did the contact 235 to again energize the coil 238 and excite the magnetic poles 206. The magnetic poles then cooperate with the armatures 264 and 242 to move the drum 204 another step and bring the numeral "6" into view at the window 209. In the same manner, the coils 238, 249 and 260 are energized successively with each impulse transmitted through the coil 224, to revolve the drum 204 in steps, the number of steps of movement depending upon the number of impulses transmitted to the coil 224. In this instance, nine impulses are transmitted to the coil 224 to revolve the drum 204 nine steps and bring the numeral "1" into view at the window 209.

The value of the second digit of the number representing the desired distance of movement in this instance is "9," requiring two impulses from the photoelectric cell 70 which moves the wiper arm 105 two steps and the wiper arm 211 over its first contact 230 and then to its next contact, resulting in one impulse to the coil 224. The wiper arm 234 would therefore move one step to bring the numeral "9" into view at the window 209. In the same manner, the remaining digits of the number appear at the window 209 to indicate the number which has been registered as representing the desired distance of movement.

After the movable element being positioned has been stopped at its final position, the stepping switches 107, 113, 114, 115, 116 and 197 are automatically reset to the zero position shown in Fig. 3. This is accomplished in the same manner as fully described and illustrated in my previously mentioned copending application. The wiper arm 211 therefore creates ten impulses through the coil 224 during every positioning operation, that is, first a sufficient number of impulses are created to move the proper numeral on the dial 204 into view at the window 209, and after the positioning operation is completed, a sufficient number of impulses are transmitted to the coil 224 to total ten altogether. For this reason, after the positioning operation is completed, the numeral "0" will reappear at the window 209 on each of the drums.

For example, the value of the first digit was "1," requiring ten impulses from the photoelectric cell 70 to the coil 108 of the stepping switch 107. As the wiper arm 105 moved ten steps over its cooperating contacts 106, the wiper arm 211 was also moved ten steps but the first step merely moved it over its elongated contact 230 so that the flow of current to the coil 224 was not interrupted. Each remaining increment of movement of the wiper arm 211 over its contacts 233, however, interrupted the flow of current to create nine electrical impulses through the coil 224 to move the wiper arm 234 nine steps over its cooperating contacts to bring the numeral "1" into view at the window 209 as previously described. Ten increments of movement of the wiper arm 211 will bring it into communication with its last contact 266. When the wiper arm 105 of the stepping switch 107 is reset to zero, the wiper arm 211 will move with it from the contact 266 into communication with the contact 230, resulting in one impulse to the coil 224 to again bring the numeral "0" into view at the window 209. Thus, the numeral indicator is prepared for the next positioning operation.

Summarizing the sequence of operations to position a movable element of a machine tool with the present invention, the initial step is to perforate the tape 83, as required, to obtain the desired distance of movement and make the proper connections for the movable element to be positioned and its direction of movement. The tape 83 is then moved through the beams of light emanating from the source 81, the light passing through the perforations striking the photoelectric cells 76, 70, 71, 72, 73, 74 and 75, causing them to transmit electrical impulses. The impulses from the photoelectric cell 76 are transmitted to the selector element 77 through the amplifier 78, to make the proper electrical connections for the movable element to be positioned and its direction of movement. The impulses from the photoelectric cells 70, 71, 72, 73 and 74 are transmitted to the counter 59 through the amplifier 78 to register the first five digits of the number representing the desired distance of movement. The impulses from the photoelectric cell 75 are transmitted through the amplifier 78 to the stepping switch 121 moving the wiper arm 122, to establish the digit representing tenths of thousandths of an inch by selecting the proper vernier position at which the dial 24 will be scanned. The impulses from the photoelectric cell 75 are also transmitted to the coil 218 of the stepping switch 197 to actuate its wiper arm and the wiper arm 211 of the stepping switch 217 to register the number of tenths of thousandths of an inch of movement on the numeral indicator. The impulses for registering the other numbers representing the desired distance of movement also function to actuate the numeral indicator and visibly record the number to enable it to be observed at any time during the cycle of operation.

Upon selecting the movable element to be positioned, as well as its direction of movement and registering the number representing the desired distance of movement, the direction switch 135 is manipulated according to the direction of movement desired and the corresponding push button 136, 137 or 138 is actuated to energize the rapid speed motor 20 for rotating the screw 18 to move the gauge nut 17. The circular dial 24 rotates with the screw 18 and each of its graduation marks passing the selected one of the scanning units 26 is projected by the scanning unit onto the photoelectric cell 43 causing it to transmit an electrical impulse to the counter 59. When the number of impulses transmitted to the counter 59 by the photoelectric cell 43 approaches the total of the number representing the desired distance of movement previously registered on the counter 59, the counter energizes the relay 60 to open its contact 61 and deenergize the rapid rate motor 20. The slow speed motor 21 is then automatically energized to drive the gauge nut 17 at a slow rate until the number of impulses transmitted to the counter 59 by the photoelectric cell 43 equals the total of the number previously registered on the counter, when the counter actuates the relay 63 to open the contact 64 and deenergize the motor 21, stopping the gauge nut 17 at precisely the desired position.

When movement of the gauge nut 17 is terminated, the table 16 is automatically initiated in its movement at a rapid rate. As the prism 144 carried by the table 16 arrives at a certain position relative to the prisms 145 and 146 mounted on the gauge nut 17, it reflects the light emanating from the source 147 toward either one of the photoelectric cells 162 or 167, depending upon the direction of travel of the table 16. The first photoelectric cell to be energized by exposure to the light beam, whether it be the cell 162 or the cell 167, functions to deenergize the rapid speed motor, driving the table 16 at rapid rate, and automatically energize a slow speed motor to drive the table the remaining distance at a slow rate of speed. The table then travels at a slow rate until the prism 144 attains a position relative to the prisms 145 and 146 to direct the light beam toward the second photoelectric cell 162 or 167. The second photoelectric cell to be actuated functions to deenergize the slow speed table driving motor and stop the table 16 at precisely the desired final position ready for the next machining operation.

Upon completion of the positioning movement, the stepping switches and numeral indicator are automatically reset to zero in preparation for another positioning operation. Further movement of the perforated tape 83 then selects another movable element of the machine and sets the apparatus for positioning it in the same manner.

From the foregoing description of the construction and operation of the improved positioning mechanism provided by the present invention, it will be apparent that the new positioning mechanism is especially adapted to effect a positioning operation of any one of the several movable elements of a precision machine tool in either direction of travel, with great accuracy and a minimum of effort and attention on the part of the machine operator.

Although the illustrative embodiment of the invention has been described in considerable detail for the purpose of setting forth an operative and practical exemplifying structure, it is to be understood that the structure shown and described is intended to be illustrative only and that various characteristics of the invention may be incorporated in other structural forms without departing from the spirit and scope of the invention as defined in the subjoined claims.

The principles of the invention having now been fully explained in connection with the foregoing description of embodying structure, I hereby claim as my invention:

1. In a tripping mechanism for stopping a movable element of a machine tool having a base with the movable element mounted on said base, a motor connected to effect initial movement of said movable element at a rapid speed, a second motor connected to drive said movable element at a slow speed to the final predetermined position, a gauge element mounted on said base and movable to establish the final position of said movable element, a light source, reflecting means mounted on said movable element in position to receive the light from said light source, second reflecting means fixed to said gauge element in position to receive the light from said first reflecting means when it moves into the proper position in respect to said second reflecting means, a photoelectric cell connected in the motor electrical circuit to control the operation of either motor, and mounted in position to receive light reflected from said second reflecting means when said second reflecting means and first reflecting means attain a certain position relative to each other said photoelectric cell being connected so that when actuated by such light it will cause deenergization of the rapid speed motor if it is operating or the slow speed motor if the rapid speed motor has already been deenergized, and a second photoelectric cell connected in the motor electrical circuit to control the operation of either motor and mounted in position to receive light reflected from said second reflecting means when said second reflecting means and first reflecting means attain another position relative to each other, said second photoelectric cell being connected so that when actuated by such light it will cause deenergization of the rapid speed motor if it is operating or the slow speed motor if the rapid speed motor has already been deenergized.

2. In a positioning mechanism for a movable element of a machine, a motor connected to drive said movable element in its initial movement at rapid speed, a second motor connected to effect the final movement of said movable element at a slow speed to the precise predetermined position, a light source, a pair of photoelectric cells connected in the motor electrical circuit and mounted on the machine in position to receive the light from said light source, so that either one, depending upon the direction of travel of said movable element, will be exposed to said light source when said movable element reaches a point a predetermined distance from the final position, while the other photoelectric cell will be exposed to said light source when said movable element reaches the final desired position, a switch connected in the motor electrical circuit to be actuated by whichever of said photoelectric cells is first exposed to light to deenergize the rapid speed motor, and a second switch connected in the motor electrical circuit to be actuated by the second photoelectric cell exposed to light to deenergize the slow speed motor and thereby stop said movable element at precisely the predetermined position.

3. In a positioning mechanism for a movable element of a machine tool, a source of power connected to drive said movable element, a light source, a reflector mounted on said movable element in position to receive the light from said source and deflect it angularly, a pair of photoelectric cells mounted in position so that one or the other, depending upon the direction of travel of said movable element, will be exposed to the light reflected by said reflector when said movable element approaches its final predetermined position, while the other photoelectric cell will be exposed to the light reflected by said reflector when said movable element arrives at its final predetermined position, a switch connected to control said power source and to be actuated by whichever photoelectric cell is first exposed to light to reduce the power transmitted by said power source and thereby decrease the speed of said movable element, and a second switch connected to control said power source and to be actuated by the second photoelectric cell to be exposed to light to disconnect said power source and thereby stop said movable element at the precise predetermined position.

4. In a positioning mechanism for a movable element of a machine tool, a source of power connected to drive said movable element, a gauge element movable to establish the final position of said movable element, a tripping element mounted on said movable element in position to cooperate with said gauge element, a pair of switches connected to control said source of power and to be operable successively by the arrival of said tripping element at a certain position relative to said gauge element, said switches being so constructed and arranged that the one to be actuated first, depending upon the direction of travel of said movable element, will operate to reduce the power transmitted from said source for driving the movable element and thereby its speed, and the second switch to be actuated will operate to disconnect said source of power and thereby stop said movable element at the precise predetermined position established by the setting of said gauge element.

5. In a positioning mechanism for a movable element of a machine tool, a source of power connected to drive said movable element, a light source, a gauge element movable to establish the final position of said movable element, a pair of photoelectric cells mounted in position so that one will be exposed to said light source when said movable element reaches a certain relative position in respect to said gauge element while the other photoelectric cell will be exposed to said light source when said movable element reaches a second relative position in respect to said gauge element, a switch connected to control said source of power and to be actuated by whichever photoelectric cell is first exposed to said light source to reduce the power transmitted from said source of power for driving said movable element and thereby decrease the speed of said movable element and a second switch connected to control said power source and to be actuated by the second photoelectric cell exposed to said light source to disconnect said source of power and thereby stop the movement of said movable element at the precise predetermined position.

6. In a positioning mechanism for a movable element of a machine tool, a source of power connected to drive said movable element, a light source, a gauge element movable to establish the final position of said movable element, and a pair of photoelectric cells connected to control said source of power and mounted in position so that one or the other depending upon the direction of travel of said movable element will be exposed to said light source when said movable element reaches a certain relative position in respect to said gauge element and when actuated by such light will operate to decrease the power transmitted from said source of power to thereby reduce the speed of said movable element, while the second photoelectric cell will be exposed to said light source when said movable element reaches a second relative position in respect to said gauge element and when actuated by such light will operate to disconnect the power source and thereby stop the movement of said movable element at the precise predetermined position.

7. In a machine tool having a base, a movable member slidably mounted on said base, power driven mechanism operatively connected to effect movement of said member relative to said base, a light source mounted on said base, light reflecting means carried by said movable member in position to reflect light from said light source, photoelectric control means supported by said base in position to receive light reflected from said reflecting means, trip mechanism connected to respond to movement of said slidably mounted member to a predetermined position relative to said base and operative upon said light reflecting means to change the effect of the reflected light upon said photoelectric control means, and a control circuit connected between said photoelectric control means and said power driven mechanism to be actuated by said photoelectric control means in response to change in light reflected thereupon to control said power driven mechanism in effecting movement of said movably mounted member.

8. In a measuring apparatus, a rotatably mounted dial of drum shape presenting on its inner surface a cylindrical scale comprising divisions set off by equally spaced indicia representing values and having different light reflecting qualities than the background, a plurality of scanning stations fixedly supported in vernier relationship within said drum dial, each of said stations comprising an electric light source and a magnifying lens system, a photoelectric cell mounted in position to receive the light reflected from said scale through said lens systems, and a selector control means connected between said light sources and their source of electric power to activate said light sources selectively, whereby any one of said scanning stations may be selected for scanning said dial scale and actuating said photoelectric cell in response to the passing of a scale indicium to effect a measurement based on the number of scale indicia scanned by said cell together with a fraction of a scale division established by the vernier effect of the particular station selected.

9. In a measuring apparatus, a scale presenting spaced indicia representing values and having different light reflective qualities than the background, a photoelectric cell mounted in position to scan said scale indicia in manner to detect movement thereof, a plurality of electric light sources fixedly supported opposite said scale to illuminate different parts of the scale selectively, and control means operatively connected between said light sources and their source of electric power to select one or another of said light sources for activation to illuminate said scale at a selected position for effecting a desired cooperation with said photoelectric cell.

10. In a positioning mechanism for a movable element of a machine tool, a source of light, a movable perforated tape located to receive the light from said source, a plurality of photoelectric cells arranged to receive the light passing through the perforations of said tape as said tape moves transversely to the rays of light, a counting mechanism connected to register impulses received from said photoelectric cells as they are exposed to the light passing through said perforations, a source of power connected to drive said movable element, and a control mechanism connected to be actuated by said counting mechanism to disconnect said power source and terminate movement of said movable element after it has moved a distance corresponding to the number of impulses received by said counting mechanism.

11. In a positioning mechanism for a movable element of a machine tool, a source of power connected to drive said movable element, a source of light, a photoelectric cell for each digit of the number representing the distance of movement of said movable element located to receive the light from said source, a movable tape disposed between said light source and said photoelectric cells to intercept the light directed toward said photoelectric cells and having a group of perforations for each digit of the number representing the distance of movement each group having a number of perforations corresponding to the value of the digit it represents, a counting mechanism connected to receive impulses from said photoelectric cells each time a beam of light passes through the perforations of said tape to register the number representing the desired distance of movement, a scale presenting indicia arranged to move with said movable element, a light sensitive element located to scan said scale and transmit an impulse to said counting mechanism with each passing of a scale indicium, and a control circuit arranged to regulate said source of power and connected to be actuated by said counting mechanism to first reduce the speed of said movable element after said light sensitive element has transmitted to said counting mechanism a certain number of impulses less than the value of the number registered thereon by said movable tape and then stop said movable element after said light sensitive element has transmitted to said counting impulses a number of impulses equal to the number registered thereon by said tape.

12. In a mechanism for positioning the movable elements of a machine tool, a source of light, a movable tape located to receive the light from said source having a group of perforations for each digit of the number representing the desired distance of movement each group having a number of perforations corresponding to the value of the digit it represents and another group to determine which movable element shall be positioned having a number of perforations corresponding to a number arbitrarily designated to the movable element to be positioned, a photoelectric cell for each group of perforations located to receive the light passing through said perforations as said tape moves transversely to the rays of light, a counting mechanism connected to receive the impulses from said photoelectric cells cooperating with the groups of perforations representing the desired distance of movement, and a control element connected to receive impulses from the photoelectric cell cooperating with said element selecting group of perforations to select the movable element to be positioned in response to the number of impulses received.

13. In a mechanism for positioning the movable elements of a machine tool, a register, means connected to transmit impulses to said register for the purpose of impressing upon it a number representing the desired distance of movement, a selector element connected to receive impulses from said impulse transmitting means to select the movable element to be positioned in accordance with the number of impulses received, a second impulse transmitting means connected to transmit one impulse to said register for each unit of movement of the movable element being positioned, and a control circuit connected to be actuated by said register after it has received a number of impulses from said second impulse transmitting means corresponding to the number impressed upon it by said first impulse transmitting means to terminate movement of the movable element selected to be positioned after it has traveled the desired distance.

14. In a mechanism for positioning the movable elements of a machine tool, an electrical counter to record the number representing the desired distance of movement, means connected to register the number representing the desired distance of movement on said counter, a numeral indicator connected to receive a number of impulses corresponding to the number registered on said counter to visually indicate the number registered thereon, a gauge element supported adjacent to said movable element and movable by power to establish the final position of said movable element, means connected to transmit an impulse to said counter for each unit of movement of said gauge element, a control circuit actuated by said counter when it receives a number of impulses from said impulse transmitting means a predetermined number less than the number registered thereon to decrease the speed of said gauge element and to finally terminate its movement at the precise desired position when said counter has received a number of impulses corresponding to the number registered thereon, a reflecting element mounted on said movable element, a reflecting element mounted on said gauge element, a light source located to direct its light toward said reflecting elements, a photoelectric cell arranged to receive the light from said source through said reflecting elements when said reflecting elements are in a certain position relative to each other, a second photoelectric cell located to receive the light from said source through said reflecting elements when said reflecting elements obtain another position relative to each other, a switch connected to be actuated by whichever of said photoelectric cells are first exposed to light to decrease the speed of said movable element, and a second switch connected to be actuated by the second photoelectric cell to be exposed to light to terminate movement of said movable element at the precise position established by the location of said gauge element.

15. In a mechanism for positioning the movable elements of a machine tool, a photoelectric cell for each digit of the number representing the desired distance of movement, means arranged to selectively vary the light striking each of said photoelectric cells a number of times corresponding to the predetermined value of the digit which it represents, a counter connected to receive electrical impulses from said photoelectric cells to register the number representing the desired distance of movement, a stepping switch having a wiper arm with cooperating contacts for each digit of the numeral being registered connected to be actuated with said counter as it receives impulses from said photoelectric cells, each impulse functioning to move said switch one step, a plurality of coils connected to said stepping switch to be energized successively as the wiper arm of said stepping switch moves across its cooperating contacts, a pair of magnetic poles for each of said coils arranged to be excited by said coils when energized, and a series of armatures mounted on a drum bearing the numerical characters and arranged to cooperate with said magnetic poles to rotate the drum each time another coil is energized so as to revolve the drum one step to bring the succeeding numerical character into view at a window visible to the operator.

16. In an electric numeral indicator, a shaft, a drum bearing numerals for each digit of the number to be indicated rotatably mounted on said shaft, a plurality of armatures secured to said drum, a source of power, a plurality of magnetic poles located to cooperate with said armatures, and a plurality of coils connected to said source of power and located to excite said magnetic poles when energized, so constructed and arranged that said drum is rotated one step with each electrical impulse transmitted to said coils to present a new number at the indicating position.

17. In an electric numeral indicator, a shaft, a drum bearing numerals for each digit of the number to be indicated rotatably mounted on said shaft, a plurality of armatures secured to said drum, a source of power, a plurality of magnetic poles located to cooperate with said armatures, a plurality of coils arranged to excite said magnetic poles selectively when energized, a series of contacts having electrical connection with said coils, a wiper arm connected to said source of power rotatably mounted to communicate with said contacts successively to energize the coil having electrical connection with the contact in communication with said wiper arm, a coil arranged to actuate said wiper arm in steps from one of its cooperating contacts to the next, and a stepping switch connected to said wiper arm coil to transmit electrical impulses to it to move said wiper arm across said contacts to energize said magnetic pole coils successively with a corresponding excitation of said magnetic poles to revolve said drum in steps the number of steps depending upon the number of impulses transmitted by said stepping switch to present the desired numeral on said drum at the indicating position.

18. In an electric counter, a shaft, a drum for each digit of the largest number to be recorded rotatably mounted on said shaft and bearing the numerical characters, a window located adjacent to said drums at which one numeral of each drum will appear depending upon the rotative position of said drums, a plurality of armatures secured to each drum, a plurality of magnetic poles for each drum located to cooperate with said armatures, a plurality of coils for each of said drums arranged to excite said magnetic poles when energized, a source of power, and a stepping switch connected to said source of power and arranged to energize said coils selectively when actuated to excite said magnetic poles successively, whereby said magnetic poles cooperate with said armatures to revolve said drum one step each time said stepping switch transmits an electrical impulse to one of said coils to present the succeeding numeral of said drum at said window.

19. In a measuring apparatus, a housing, a dial of drum shape rotatably mounted within said housing and presenting on its inner surface a scale of equally spaced indicia having different reflective qualities than the background, a plurality of electric light sources fixedly mounted in said housing in vernier relationship in position to illuminate said scale selectively, a photoelectric cell mounted in said housing in position to receive the light reflected from said scale, and control means connected in the electrical circuit of said light sources and operative to select one or another of said light sources to illuminate said scale at a desired position for achieving a predetermined vernier effect, whereby as said dial is rotated the passing of each indicium is recorded by the photoelectric cell to indicate a unit of measurement while fractions of the unit indicated by said scale are determined by the vernier position of the light source selected for illuminating the scale.

20. In a measuring apparatus, a rotatably mounted dial of drum shape presenting a scale of equally spaced indicia on its inner surface, said indicia having different light transmission qualities than the background, adjustable illuminating means mounted opposite said scale in position to direct a beam of light onto said scale at a plurality of positions selectively, said positions being located in vernier relationship with respect to said scale, and a photoelectric cell mounted in position to scan said scale at its point of illumination and receive the light reflected from it, said photoelectric cell being connected in an electrical circuit to be actuated by the change in light reflected from said scale each time an indicium passes the point of illumination, whereby the units of measurement equal to the smallest division of the scale are indicated by each activation of the photoelectric cell and a fraction of the smallest division of the scale is determined from the position at which the scale is illuminated.

21. In a positioning mechanism for a movable member of a machine, a motor operatively connected to drive said movable member in its path of movement at a rapid speed, a second motor operatively connected to drive said movable member in its path of movement at a slow speed, a tripping element mounted on said movable member, a pair of switches mounted on said machine in position to be actuated by said tripping element as said movable member travels in its path of movement and in a sequence dependent upon the direction of movement of said movable member, said switches being connected in the electrical circuit of said motors to control their operation, the first of said switches to be actuated, irrespective of which one of the two it is, depending upon the direction of movement of said movable member, operating to deenergize said rapid speed motor, and the second switch to be actuated operating to deenergize said slow speed motor, whereby said movable member will first travel at a rapid rate and upon actuation of either one of the two switches will travel at a slow rate until the actuation of the second switch when its movement will be stopped.

22. In a measuring apparatus, a movably mounted scale presenting spaced indicia having different light reflective qualities than the background and representing predetermined values, a source of light disposed to direct a beam of light onto said scale, a photoelectric device mounted in position to receive light from said source after it is reflected from said scale, said photoelectric device being electrically connected to be actuated by the variation in the amount of light striking it as said indicia pass its line of sight and thereby vary the amount of light reflected onto it so that each actuation of said photoelectric device indicates one unit of measurement, and adjusting means connected to said light source to vary the direction of its beam and thereby control the position at which it illuminates said scale for scanning by said photoelectric device so that the position at which said photoelectric device will scan said scale may be predetermined to obtain a vernier effect in the measuring operation.

(References on following page)

References Cited in the file of this patent

UNITED STATES PATENTS

| Number | Name | Date |
|---|---|---|
| 921,280 | Radtke | May 11, 1909 |
| 1,444,505 | Hathaway | Feb. 6, 1923 |
| 1,916,997 | Tauschek | July 4, 1933 |
| 1,981,224 | DeVlieg | Nov. 20, 1934 |
| 2,012,249 | Sassen | Aug. 20, 1935 |
| 2,087,039 | McMaster | July 13, 1937 |
| 2,134,743 | Strawn | Nov. 1, 1938 |
| 2,302,025 | Gould | Nov. 17, 1942 |
| 2,311,142 | Turrettini | Feb. 16, 1943 |
| 2,346,869 | Poole | Apr. 18, 1944 |
| 2,348,141 | Luhn | May 2, 1944 |
| 2,375,665 | Koulicovitch | May 8, 1945 |
| 2,390,415 | Bailey et al. | Dec. 4, 1945 |
| 2,393,186 | Potter | Jan. 15, 1946 |
| 2,406,299 | Koulicovitch | Aug. 20, 1946 |
| 2,440,083 | Gley | Apr. 20, 1948 |
| 2,441,549 | Cooke | May 11, 1948 |
| 2,466,167 | Foulds | Apr. 5, 1949 |
| 2,469,594 | Danforth | May 10, 1949 |
| 2,475,245 | Leaver | July 5, 1949 |
| 2,517,559 | Haigh et al. | Aug. 8, 1950 |
| 2,575,034 | Tyler | Nov. 13, 1951 |